US005351601A

United States Patent [19]

Zeuner et al.

[11] Patent Number: 5,351,601

[45] Date of Patent: Oct. 4, 1994

[54] HYDRAULIC CONTROL SYSTEM

[75] Inventors: Kenneth W. Zeuner, New Hope; Charles Heisig, New Holland, both of Pa.

[73] Assignee: Control Concepts, Inc., Newtown, Pa.

[21] Appl. No.: 878,349

[22] Filed: May 4, 1992

[51] Int. Cl.[5] ........................ F15B 11/08; F16D 31/02

[52] U.S. Cl. ........................................ 91/445; 91/448; 91/461; 60/468

[58] Field of Search ................. 91/437, 464, 444, 446, 91/448, 461, 445; 60/468, 494

[56] References Cited

U.S. PATENT DOCUMENTS

| | | | |
|---|---|---|---|
| 2,526,709 | 10/1950 | Tait . | |
| 2,555,755 | 6/1951 | Moore . | |
| 2,600,348 | 6/1952 | Walthers . | |
| 2,655,940 | 10/1953 | Jackson . | |
| 3,060,969 | 10/1962 | Aslan . | |
| 3,089,517 | 5/1963 | Ludwig . | |
| 3,114,394 | 12/1963 | Panissidi . | |
| 3,234,957 | 2/1966 | Allen . | |
| 3,530,895 | 9/1970 | Rothrock . | |
| 3,692,149 | 9/1972 | Evans | 91/445 X |
| 4,034,815 | 7/1977 | Dezelan | 91/437 X |
| 4,093,002 | 6/1978 | Tardy | 91/445 X |
| 4,121,610 | 10/1978 | Harms . | |
| 4,202,250 | 5/1980 | Zeuner et al. . | |
| 4,345,736 | 8/1982 | Zeuner et al. . | |
| 4,354,351 | 10/1982 | Dezelan | 91/464 X |
| 4,401,009 | 8/1983 | Zeuner et al. . | |
| 4,589,437 | 5/1986 | Beuner et al. . | |
| 4,649,956 | 3/1987 | Zeuner et al. . | |
| 4,651,118 | 3/1987 | Beuner et al. . | |
| 5,117,950 | 6/1992 | Kobayashi et al. | 91/437 X |
| 5,207,059 | 5/1993 | Schexnayder | 91/445 X |

FOREIGN PATENT DOCUMENTS

| | | | |
|---|---|---|---|
| 94003 | 7/1980 | Japan | 91/437 |
| 1261134 | 1/1972 | United Kingdom | 91/437 |

*Primary Examiner*—Edward K. Look
*Assistant Examiner*—Hoang Nguyen
*Attorney, Agent, or Firm*—Ratner & Prestia

[57] ABSTRACT

A hydraulic control system in which the flow of hydraulic fluid to and from cylinders on either side of a piston is controlled by normally closed check valves that are opened whenever a control valve is not in its neutral state. Float check valves respectively in series with the check valves and the check valves are opened when the control valve is in a neutral state by pressure from one of the cylinders so as to permit the load to move freely in response to external forces applied to it. A normally closed check valve is provided in which load sense pressures drive it open and pressure from a cylinder is balanced out. A cross check valve is such that the ratio of the areas for driving it open to the area for keeping it shut are at least 35:1.

6 Claims, 13 Drawing Sheets

HYDRAULIC CONTROL SYSTEM

FIELD OF THE INVENTION

This invention relates to a hydraulic control system for moving heavy loads and, in particular, to systems for use with mobile equipment.

BACKGROUND OF THE INVENTION

Servo follower proportional control valves are well known in the art and generally described in the literature. Proportional electrohydraulic control valves have become very important in replacing the lever manual controls in tractors, backhoes harvesting equipment, utility trucks and other types of hydraulic systems which are known to be operated by a joy stick. These types of controls have become more sophisticated by the use of electronic process controllers which, for example, can be located in the cab of an agricultural vehicle to properly control tile complex operation of towed implements or other attachments operating in the back of a utility truck and controlling electrohydraulic valves at ground level.

Another example in which proportional control is extremely important and continuous is with construction equipment used to level the grade of a road relative to laser beams. In this situation, precise control is required in view of the heavy machinery and the need for accuracy. Also, accurate electrical control of the hydraulic system is critical when operating either an open loop without feedback of the road surface or a closed loop with feedback.

With the above examples in mind, it is easy to see that the reliability of a hydraulic proportional control system for heavy construction or agricultural equipment is critical in view of not only the cost of the equipment but also the safety of the personnel. In this regard, prior hydraulic proportional control systems leave much to be desired when comparing their cost and complexity to the degree that they achieve reliability and effective proportional control.

Another problem with prior proportional control systems arises when attempting to maintain a weight above ground, as for example by a backhoe. The prior equipment has had the problem that spool leakage would permit the weight in the backhoe to slowly drift down. Mechanically operated proportional control valves have used cross check valves in order to maintain the heavy weight above ground. However, with prior control valve systems, when it was desired to release the weight, the weight would bounce because the pump pressure would have to come up to a pressure high enough to unlock the check valve and thus release the cylinder. Such a bounce is even more of a problem in electrically operated proportional control valve systems.

And once the check valve is unlocked, a related problem arises when the requirement is to lower the heavy load quickly and smoothly. With prior hydraulic systems, the problem is that the load would effectively run away, and the hydraulic driving pressure would approach zero. Without pressure, the cross check valves would not operate or would actually close rather than open, and the system would stop until pressure again increased enough to open the check valve. At this point, the system would resume lowering the load until the zero pressure condition occurred again. This improper operation would repeat until the load finally reached the ground. Therefore, an operator would have to lower the load more slowly than desired in order to prevent this jerky movement on the way doom. The cause of this improper operation is that the hydraulic pump could not supply pressurized fluid fast enough to keep the cross check valves open. Even with anti-cavitation devices, the hydraulic flow would be provided but at a very low pressure.

BRIEF SUMMARY OF THE INVENTION

In a control system incorporating various aspects of this invention, the flow of hydraulic fluid is controlled by a proportional valve such as described U.S. Pat. No. 4,649,956, and which is incorporated herein by reference, that has been modified so as to provide a load sense (LS) signal. This LS signal and a pressure at the inlet of the valve are applied to a compensator that maintains a constant pressure drop across the valve. The ability to hold loads in a raised position is provided by normally closed first and second flow check valves that are respectively connected in hydraulic lines leading to points in the actuation cylinder that are on opposite sides of the piston. When the control valve is in a neutral position, LS signal has a value of zero, but when it is positioned to conduct pressurized flow to one hydraulic line and connect the other to the tank, LS signal has a value other than zero, i.e., it is equal to the pressure applied to the actuation cylinder. This pressure is used to pilot both float check valves in a wide open condition so that it is possible to move the load smoothly. It is important to note that the flow check valves are not cross check valves.

The first and second flow check valves are constructed in accordance with an aspect of this invention so that the effects of pressure from the control valve is balanced out, thus making the opening of these valves responsive only to the LS signal.

The ability to provide floating operation is achieved by connection of first and second normally closed float check valves respectively in series between the aforesaid first and second flow check valves and the tank. When floating operation is desired, the control valve is placed in its neutral position. The LS signal is zero so that it does not affect the first and second flow check valves, and connections are made so that the higher of the pressures on opposite sides of the piston in the actuation cylinder will open all four check valves. Thus, as a backhoe moves up and down while being dragged over the earth, it moves the piston in the actuating cylinder back and forth so as to easily force hydraulic fluid to and from the tank.

Cavitation occurs when the piston in the actuation cylinder moves so fast that insufficient hydraulic fluid is sucked from the tank to fill one side of the actuation cylinder. The float check valve is designed such that lower pressure in this side of the cylinder opens the associated float check valve so as to form a connection to the tank.

A final aspect of the invention is the provision of a cross flow check valve that provides smoother operation. The valve that is connected to the side of the actuating cylinder from which hydraulic fluid is being driven by the piston is opened by hydraulic pressure from the other cross flow check valve. Usually, the ratio of the area to which this pressure is applied to the area exposed to pressure from the actuation cylinder is on the order of 5:1, but by use of a valve within a valve construction the ratio is increased to as much as 35:1. This allows the cross check valve to be opened with as little pressure as possible so as to eliminate the bounce or shock unloading of the check valve.

DETAILED DESCRIPTION OF THE INVENTION

I. Schematic Description of Hydraulic Control System

Figure 1:
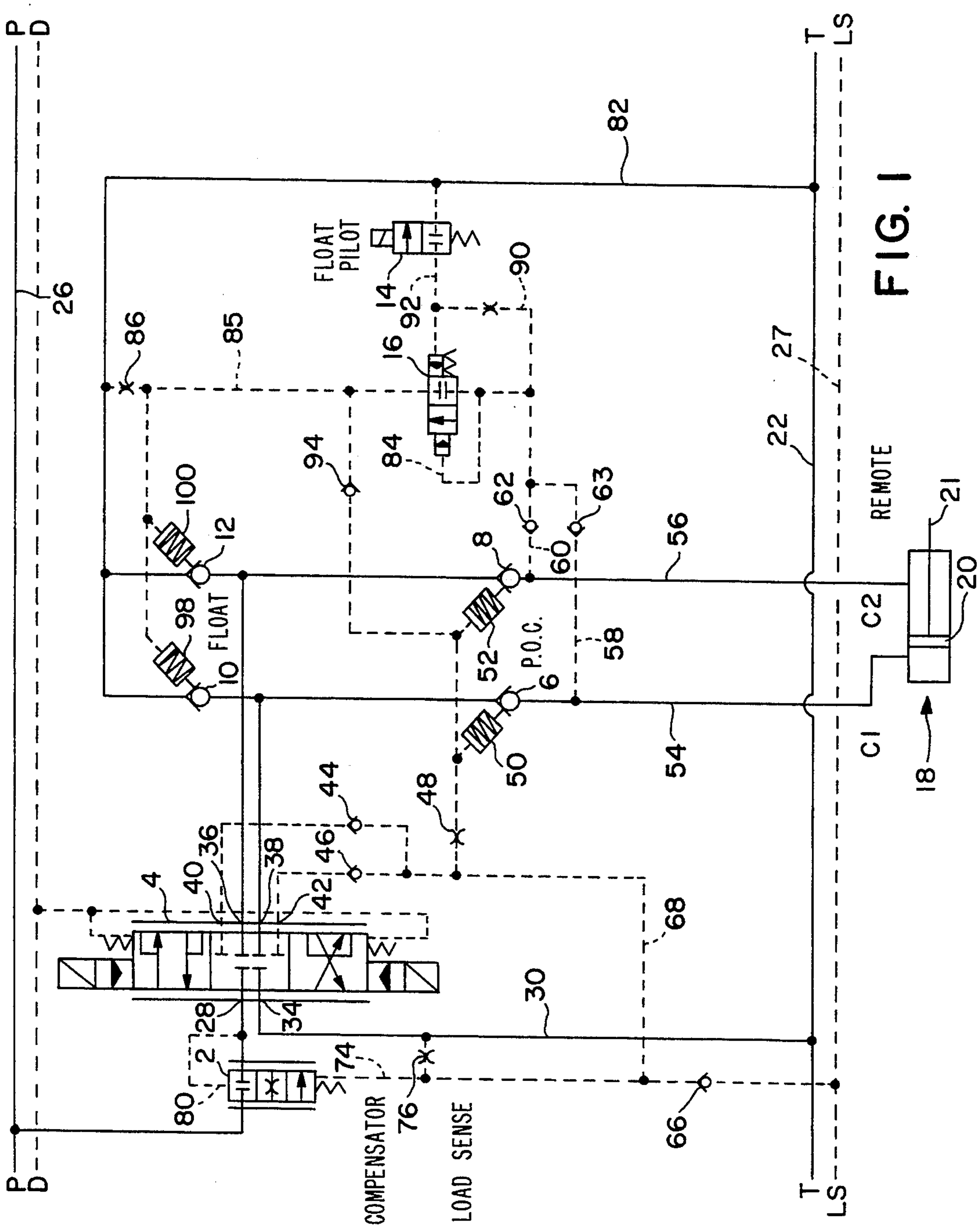
FIG. 1 is a schematic diagram illustrating operation of a system incorporating this invention wish its control valve in the neutral position.
Figure 2:
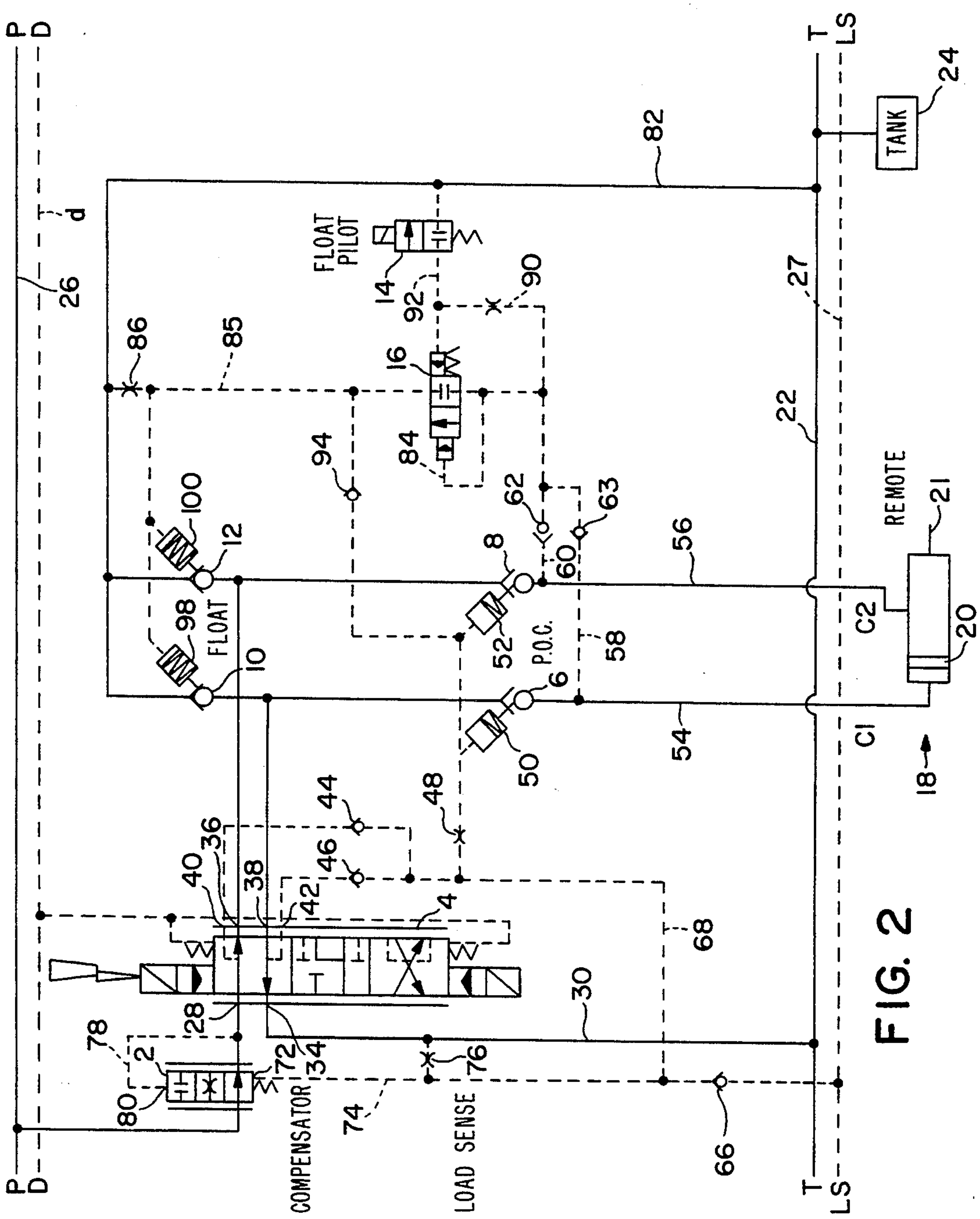
FIG. 2 is a schematic diagram illustrating the operation of a system incorporating this invention with its control valve in a position to provide pressurized hydraulic fluid to a first side of the piston in the actuating cylinder.
Figure 3:
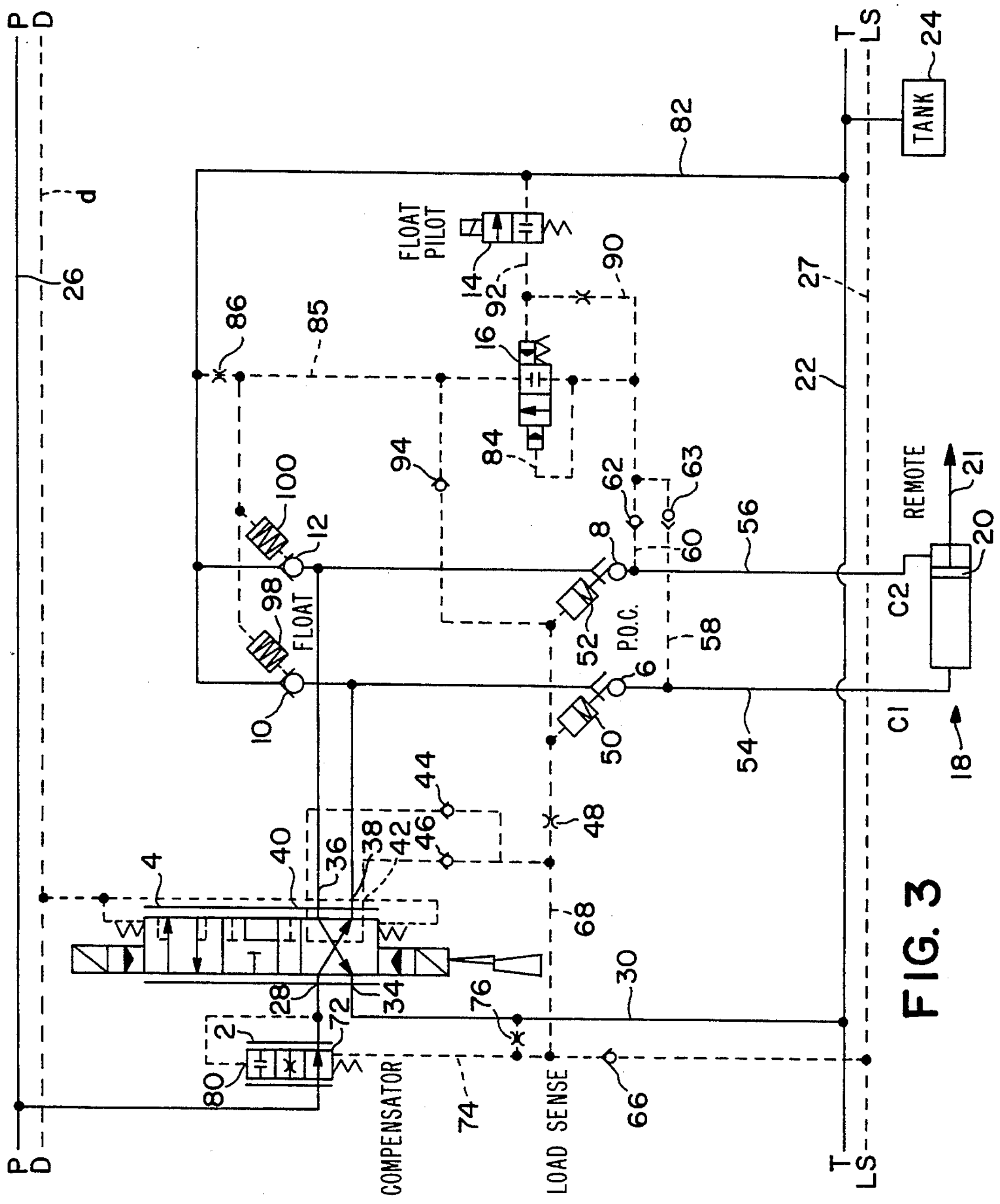
FIG. 3 is a schematic diagram illustrating the operation of a system incorporating this invention with its control valve in a position to provide pressurized hydraulic fluid to a second side of the piston in the actuating cylinder.
Figure 4:
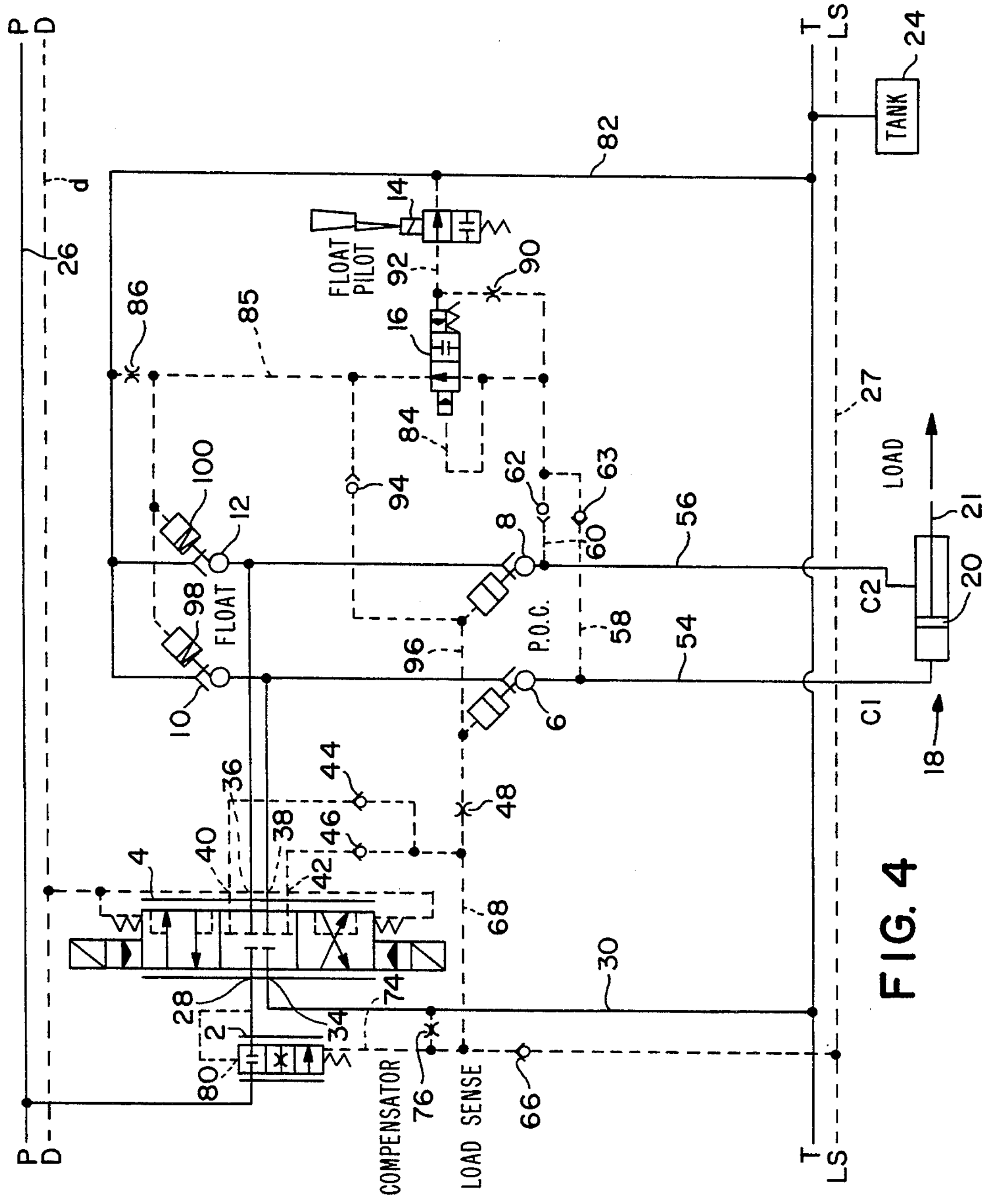
FIG. 4 is a schematic diagram illustrating the operation of a system incorporating this invention when it is in a float mode of operation.

Before describing the details of various components of this invention, a system for incorporating them in accordance with other aspects of this invention will be described in its various modes of operation. FIG. 1 shows a system with a control valve in a neutral position so that loads can be held in a given position for a long time. FIGS. 2 and 3 show a system in modes where force is being applied to a load in one direction or another, and FIG. 4 shows a system in a float mode where, for example, a backhoe is permitted to move freely as it is being dragged.

Corresponding components used in the embodiment of the invention illustrated by FIGS. 1 through 4 are designated in the same manner. Included are a pressure compensator 2, a control valve 4, the first plug means (flow check valves 6 and 8), the second plug means (float check valves 10 and 12) flow check valves 6 and a first stage float control valve 14, a second stage float control valve 16 and an actuating cylinder 18 (the load) having sections C1 and C2 on opposite sides of a piston 20, C2 being on the side containing a piston rod 21. Pressurized hydraulic fluid is applied to a high pressure line 26. For reasons that will be explained, a load sense line 27 and a drain line D are provided. Other systems like those shown in FIGS. 1 through 4 are connected to the high pressure line 26, the low pressure line 22 and the load sense pressure line in the same way, but the same pump may supply pressurized hydraulic fluid to all of the systems.

In FIGS. 1 through 4, compensator 2 couples high pressure line 26 to control valve fluid inlet 28, and line 30 couples the low pressure line 22 to control valve inlet 34. As will be explained more fully when the structure of control valve 4 is described, the control valve operates to connect inlets 28 and 34 to neither or either of its two flow outlets 36 and 38 and to provide pressure or load sense (LS) signals at outlets 40 and 42. When inlet 28 is coupled to outlet 36, the LS signal at outlet 40 indicates the pressure applied to the load, and the LS signal at the outlet 42 is zero. Conversely, if inlet 28 is coupled to outlet 38, the LS signal at outlet 42 indicates the pressure applied to the load, and the LS signal at outlet 40 is zero.

A. Control Valve in Neutral Position (FIG. 1)

FIG. 1 schematically shows control valve 4 in a neutral position. In this position, control valve inlets 28 and 34 are uncoupled from outlets 36 and 38, also load signal outlets 40 and 42 are unconnected. Because outlets 40 and 42 are unconnected, both carry a low LS signal causing check valves 44 and 46 to be closed. This configuration prevents pressure from flowing through restrictor 48 and, in turn, reaching the inlets of flow check valves 6 and 8 which are biased to the closed position by springs 50 and 52. With valves 6 and 8 closed, the pressures on flow lines 54 and 56 are the same as the pressures in sections C1 and C2 of cylinder 18, respectively. Since second stage float control valve 16 is closed, pressure does not reach the inputs of float check valves 10 and 12, thus, they remain closed and any spool leakage is bled off through line 76 to the tank.

B. Control Valve Open: Enlarge C2 (FIG. 2)

FIG. 2 schematically shows control valve 4 positioned such that inlets 28 and 34 respectively connect to outlets 36 and 38, and LS signal outlets 40 and 42 are connected as well. In this case, the LS signal at outlet 40 is high, which opens (if previously closed) control check valve 44, but the LS signal at outlet 42 is low, which closes (if previously open) control check valve 46. The LS signal passes through restrictor 48, and is applied to the LS inlet to overcome the biasing force of springs 50 and 52, and, as a result, opens flow check valves 6 and 8 (the first plug means). As shown in FIG. 2, the second; plug means (float check valves 10 and 12) remain closed. Thus, hydraulic fluid under pressure is supplied from flow line 26, through fluid inlet 28, and through flow line 56 to C2 (one side of the load means 20); and, at the same time, hydraulic fluid flows from C1 (the other side of the load means 20) to tank 24 via flow line 54, control valve 4, and flow lines 30 and 22. Thus fluid flows between the tank 24 and one of first and second sides (C1 or C2) of the load means 20 and between the fluid inlet 28 and the other side (C2 or C1) of the load means 20 actuating the load means 20 when each first plug means 6 and 8 is in its valve open state and each respective second plug means 10 and 12 is in its valve closed state.

The high LS signal which opens check valve 44, passes through line 68 and subsequently opens normally closed check valve 66, finally reaching LS line 27. One function of check valve 66 is to prevent higher LS signals on line 27 from reaching compensator 2. These higher LS signals might be generated by other systems also connected to load signal line 27. The pump (not shown), and the pressure it supplies, is controlled by the LS signal on line 27.

The pressure drop across control valve 4 is maintained at a desired value regardless of the pressure supplied to the high pressure line 26 in the following way. The high LS signal on line 68 is applied to inlet 72 of the compensator 2 via control line 74. Control line 78 connects inlet 28 of control valve 4 and inlet 80 of compensator 2. The pressures at inlets 72 and 80, which are on opposite sides of valve 4, represent the pressures at outlet 40 and inlet 28 of control valve 4. The difference between these pressures, which is the pressure drop across valve 4, is maintained constant by the compensator 2. As is seen in the figure, a restrictor 76 functioning as a bleed orifice is connected between line 74 and line 30. Each module is thus able to bleed through its own restrictor.

C. Control Value Open: Enlarge C1 (FIG. 3)

FIG. 3 schematically shows control valve 4 positioned such that inlets 28 and 34 are connected to outlets 38 and 36, respectively. Inasmuch as the operation of the system in FIG. 3 is analogous to the operation of the system in FIG. 2, it is sufficient to note that a high LS signal now passes through the control check valve 46 and to the LS inlet to open both flow check valves 6 and 8, thus coupling section C1 with the source of pressurized hydraulic fluid and section C2 with tank 24.

D. Float Mode (FIG. 4)

FIG. 4 schematically shows how a system, incorporating an aspect of the present invention, allows for floating action. To obtain this mode of operation, control valve 4 is placed in its neutral position causing low LS signals in the control lines to the left of the restrictor 48, as seen in FIG. 1.

With valves 6, 8, 10 and 12 closed, the floating action is not possible. So, when such action is desired, a pilot valve (first stage float control valve) 14 is energized to couple second stage float control valve 16 to tank 24 via flow lines 92, 82 and 22. This permits high pressure on control line 84 to move valve 16 to the position shown. In this position, control pressure from either line 60 or 58 is coupled to control line 85 which is connected via restrictor 86 to flow line 82 and, in turn, to tank 24.

The control pressure on line 84 is derived as follows. With the flow check valves 6 and 8 closed, pressure in flow lines 54 and 56 is the result of the highest pressure in cylinder sections C1 and C2. If, as illustrated in FIG. 4, the load is in the direction indicated by arrow 88, the pressure in C2 is greater than the pressure in C1 causing control check valve 62 to open.

With check valve 62 open and check valve 63 closed, fluid is prevented from flowing from line 56 to line 54. In addition, the high pressure from line 56 then flows to line 85 opening check valve 94 and thus supplying high pressure to the LS inlets of check valves 6 and 8 thereby opening these check valves. In addition, the high pressure on line 85 is applied to the control inlets (shown in FIG. *6c*) of anti-cavitation check valves 10 and 12 thereby to open these check valves. Thus, the high pressure in line 56 may now flow through check valve 8 and check valve 12, through check valve 10 and check valve 6 back to line 54 and the other side of the cylinder 18.

Check valves 10 and 12 operate as anti-cavitation valves since, if there is any requirement for fluid by cylinder 18, this fluid is pulled from the tank through line 82 and through either of valves 10 or 12 to the requiring side of the cylinder. It is in this manner that the load is able to float.

II. Structural Description of Control Valve (FIG. 5A, B)

Figure 5B:
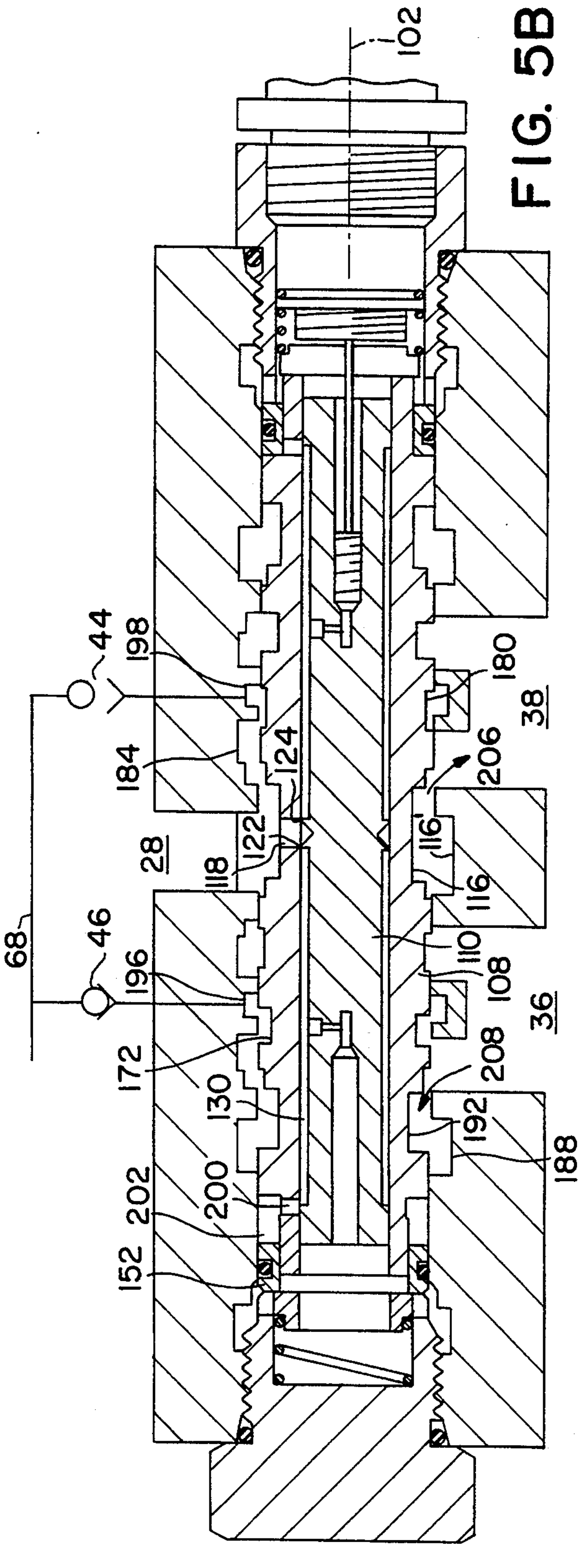
FIG. 5B is a cross sectional view like that of FIG. 5A except that it shows the valve in a position where hydraulic fluid is flowing.
Figure 5A:
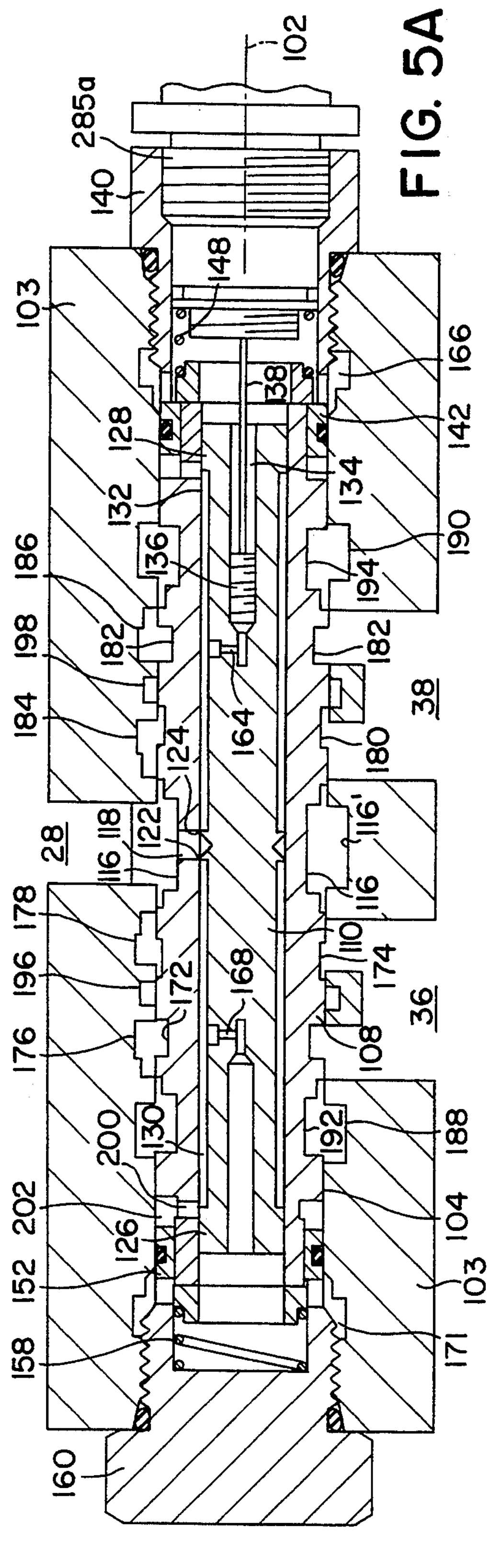
FIG. 5A is a cross sectional view of a proportional control valve incorporating an aspect of this invention when it is in a neutral position so that no hydraulic fluid is flowing.

FIG. 5A is a cross section taken through an axis 102 of an embodiment of control valve 4 which is schematically represented in FIGS. 1 through 4. The valve is shown in its neutral position. Except for a difference that will be described, it is similar to the valve described in U.S. Pat. No. 4,649,956 issued Mar. 17, 1987, which is incorporated herein by reference.

The control valve of FIG. 5A is comprised of a housing 103 having a generally cylindrical space 104 with 102 as its axis, a coaxial hollow outer spool 108 having a slide fit with the walls of the cylindrical space 104 and a coaxial pilot spool 110 within it. Pressurized hydraulic fluid from compensator 2, as previously noted, flows to inlet 28 which communicates with a centrally located annular groove 116 in the outer wall of spool 108. A passageway 118 extends from the bottom of groove 116 to the inside of hollow spool 108 (a filter 120 may be included in passageway 118). Annular ridges 122 and 124 on the outer surface of pilot spool 110 are spaced so as to be on either side of passageway 118 and seal it off. Cylindrical hubs 126 and 128 at the ends of pilot spool 110 provide bearing surfaces with the inner cylindrical surface of outer spool 108. The structure described forms a long annular space 130 between hub 126 and ridge 122 and another long annular space 132 between hub 128 and ridge 124.

Precise coaxial alignment of pilot spool 110 and outer spool 108 is necessary in order to obtain smooth operation. Thus, in accordance with another aspect of this invention, a cylindrical cavity 134 that is coaxial with the axis 102 is formed in one end of pilot spool 110, and a cylinder 136 is mounted with a slide fit in cavity 134. One end of spring shaft 138 is attached to cylinder 136, and the shaft extends along axis 102. The other end of shaft 138 is firmly imbedded in a fixture 140 that is threaded into housing 103.

An annular collar 142 is shaped to have a slide fit over one end of outer spool 108. A coil spring 148 exerts an axial force between the collar 142 and the threaded fixture 140. Another annual collar 152 that fits over the other end of outer spool 108 is also provided; and a coil spring 158 extends between the collar 152 and a fixture 160 that is threaded into the housing 103.

Hydraulic fluid contained in the annular space 132 between pilot spool 110 and outer spool 108 is drained via a radial passageway 164 in pilot spool 110, the cavity 134 with which it connects, the space within the collar 142, the space between collar 142 and the fixture 140 to an annular groove 166 in housing 103 that is connected in a manner not shown to a drain line.

Hydraulic fluid contained in annular space 130 between pilot spool 110 and the outer spool 108 is drained via a radial passageway 168 in pilot spool 110, an axial passageway 170, the space within collar 152, the space between collar 152 and fixture 160 to an annular groove 171 in housing 103 that is connected to a drain line in a manner not shown.

When control valve 4 is in the neutral position, as shown in FIG. 5A, the fluid in annular grooves 116 and 116' is blocked off from outlet 36 which communicates with annular grooves 172 and 174 in the outer surface of outer spool 108. These grooves communicate with annular grooves 176 and 178 in housing 103 that do not appear in the lower side of the housing 103 because of the outlet passageway 36. For similar reasons, the fluid in annular grooves 116 and 116' cannot reach outlet 38 because they are blocked off from annular grooves 180 and 182 in outer spool 108. These grooves communicate with annular grooves 184 and 186 in housing 103 that do not appear in the lower side of housing 103 because of outlet passageway 38.

The inlet 34 to control valve 4 is coupled in any suitable manner to annular grooves 188 and 190 in housing 103, and they respectively communicate with annular grooves 192 and 194 in outer spool 108, but, in the situation seen in FIG. 5A, no hydraulic fluid from these grooves reaches outlet 36 or outlet 38.

An important difference between the control valve of this invention and that of the incorporated patent is the presence of annular groove 196 in housing 103 at a location between annular grooves 176 and 178. Note that groove 196 is not interrupted by passageway 36. A similar annular groove 198 in housing 103 is located between grooves 184 and 186. Grooves 196 and 198 each provide a load sense signal (LS signal) corresponding to the pressure thereat, but these signals would be zero in FIG. 5A because no load pressure reaches them. The situation in FIG. 5A is that described in connection with FIG. 1 when control valve 4 is in a neutral position. In general, whichever direction outer spool 108 moves during operation, the annular groove on that side, 196 or 198, is opened to the high pressure. If LS groove 196 is opened to high pressure then LS groove 198 is opened to tank 24, and vice versa.

A controlled flow from inlet 28 to outlet 38 along with a controlled flow from tank 24 to outlet 36, as seen in FIG. 3, is effected in the following manner. Assume that pilot spool 110 is moved to the right a given distance so that pressurized hydraulic fluid at inlet 28 passes through opening 118, passing annular ridge 122 and into annular space 130 between pilot spool 110 and outer spool 108. It then flows into passageway 200 and continues into annular space 202 located between outer spool 108 and collar 152. Since collar 152 is fixed, the hydraulic pressure on the end of outer spool 108 will drive it to the right. This motion continues until annular ridges 122 and 124 again seal off passageway 118.

FIG. 5B illustrates the above situation once outer spool 108 has caught up with pilot spool 110. Now there is communication between annular grooves 116, 116' and outlet 38 via grooves 180 and 184 as indicated by arrow 206. There is also communication between annular grooves 188 and 192 and outlet 36 as indicated by arrow 208. The amount of communication increases as pilot spool 110 is moved to the right.

Also note that there is communication between inlet 28 and annular groove 198 so as to supply a high LS signal thereat. At the same time, there is also communication between annular grooves 188 and 192, that, as previously noted, are connected to tank 24, and annular groove 196 via groove 172 to provide an LS signal indicating tank pressure at groove 196.

The reason for using the LS signals to control flow check valves 6 and 8 is that a high LS signal is only generated when control valve 4 is not in its neutral position, i.e., when pressurized hydraulic fluid is to be conducted to C1 or C2. Whereas it might seem that the pressures at C1 and C2 could be used, they occur at other times, for instance, when a load is being held aloft. Other means could be used for indicating when control valve 4 is not in its neutral position such as the electrical signals for driving pilot spool 108, but the use of LS signal's as described is simple, inexpensive and reliable.

In order to better correlate the physical control valve of FIGS. 5A and 5B with the schematic drawings illustrating the operation of the system FIGS. 1 through 4, in FIG. 5B, control check valves 44 and 46 have been shown connected to grooves 196 and 198 for accessing the LS signals.

III. Structural Description of Flow/Float Check Valves (FIGS. 6A, B, C, D)

In the following description of flow check valves like those in FIGS. 1–4 and float check valves like those in FIGS. 1–4, references are made to FIGS. 6A, 6B, 6C and 6D, in which the same components are designated in the same manner. Although not shown, a fluid outlet, tank 24, is coupled to passageway 210, outlet 36 of the control valve is coupled to passageway 212, and C2 is coupled to passageway 214.

Figure 6A:
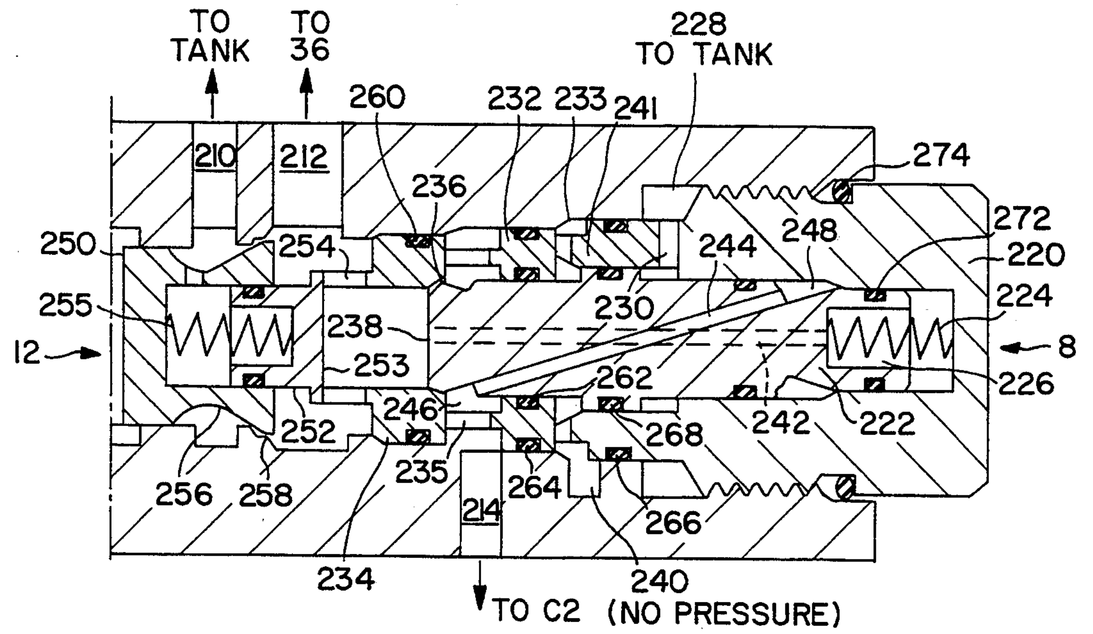
FIG. 6A is a cross sectional view of flow and float check valves incorporating this invention when both valves are closed.

In FIG. 6A, both the float check valve 12 and the flow check valve 8 are closed as is the case when control valve 4 is in its neutral position (see FIG. 1). Thus, there is no flow between any of the passageways 210, 212 and/or 214.

The flow check valve 8 is generally comprised of a cup 220 threaded into a housing 218, a plug or poppet 222 mounted within the cup 220 and a compressed coil (bias) spring 224 having one end bearing against the bottom of cup 220 and its other end within a cylindrical hole 226 in poppet 222. An annular passageway 228 in housing 218 provides a coupling via a connection, not shown, to tank 24, and it is coupled to a passageway 230 for the purpose of draining hydraulic fluid along the surface of poppet 222. An annular member 232 having axial projections 233 is mounted with a slide fit on poppet 222. A second annular member 234 having axial projections 235 is mounted with a slide fit within housing 218 and has an annular valve seat 236 or orifice against which poppet 222 is forced by spring 224 so as to form a seal. The seal is between passageway 214 (which leads to C2) and a chamber 238 within member 234 that communicates with passageway 212 (which leads to outlet 36 of control valve 4). A passageway 240 provides means for application of an LS signal via a suitable passageway in housing 218. A more detailed description of how an LS signal operates in a flow control valve 8 is given below.

In order to balance out the effect of any pressure entering passageway 212 and applied to poppet 222, a passageway 242, shown in dashed lines, connects space 238 with cylindrical hole 226. Since the opposite ends of poppet 222 have the same cross sectional area, this equalizes the pressure on both sides of poppet 222 thus any pressure in passageway 212 will not move poppet 222. In addition, the pressure from cylinder C2 is applied, via passageway 214, into groove 246 and then through passageway 244 to groove 248. Because the area of groove 246 is equal to the area of groove 248, the forces created by hydraulic fluid in these grooves cancels out. Thus, the only effective force is that of spring 224 which biases poppet 222 to the left and, consequently, valve 220 closed. Upon application of a high LS signal to chamber 240, the balance of forces is upset in a direction opposite to the force of spring 224 which forces poppet 222 to the right, thus opening valve 220.

The float valve 12 is comprised of a cup 250 that slides on a cylindrical extension 252 of an annular member 253 having axial projections 254. One end of a bias spring 255 is fit into a cylindrical cavity in the near end of member 253, and its other end bears against the inside end of cup 250. The inside of an annular groove 256 in the exterior surface of cup 250 is forced by spring 255 against an annular valve seat 258 or orifice that is between passageway 210 and passageway 212. Passageway 212 communicates with space 238. A detailed description of how float valve 12 operates is provided below.

Figure 6B:
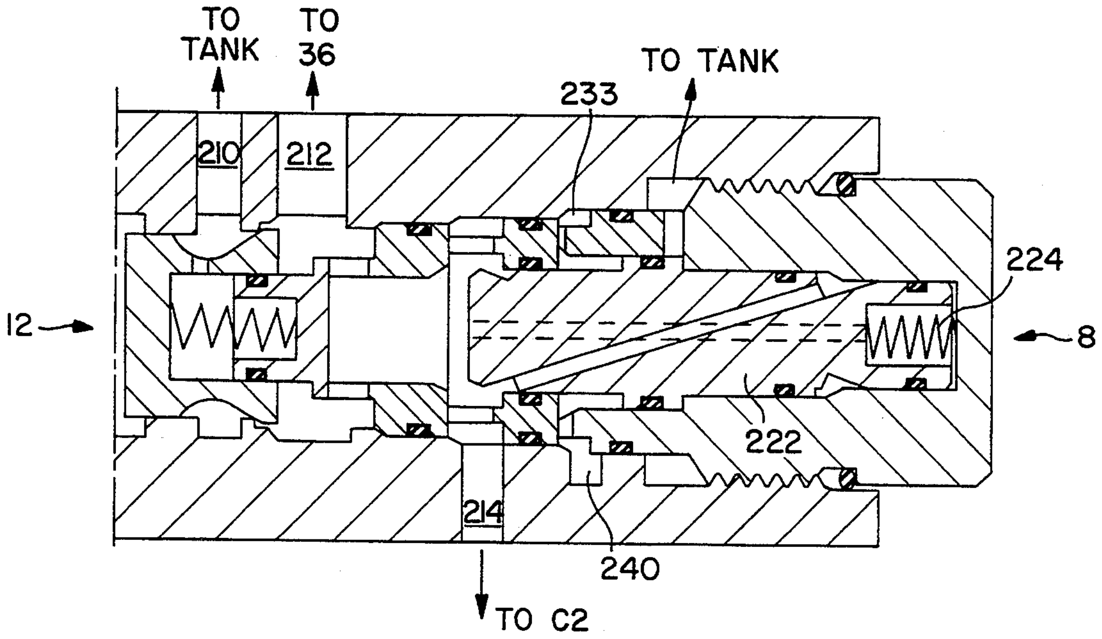
FIG. 6B is a cross sectional view of flow and float check valves incorporating this invention when the flow check valve is open and the float check valve is closed.

With respect to float check valve 12, this valve operates as both an anti-cavitation valve and a check valve. If there is positive pressure between passageways 212 and 214, the check valve moves to the left or closes as in FIG. 6B. This is the biasing direction of spring 255, which is the normal configuration as shown in FIG. 6B. Upon cavitation in C2 (experienced in passageway 214), valve 12 moves to the right, and oil from tank 24, via passageway 210, is then pulled into passageway 212 supplementing the fluid being supplied via passageway 214.

Again, cavitation occurs whenever piston 20 moves so fast that the cylinder section, C1 or C2, being enlarged cannot obtain enough hydraulic fluid. When this condition occurs, a low pressure is rapidly produced in space 238. This rapid pressure change from high to low creates a condition similar to a vacuum and the associated force overcomes the biasing force of spring 255, opens valve 12 and thus permits hydraulic fluid to be drawn from tank 24.

To simplify the description of the principle parts of the flow and float check valves, 8 and 12, a description of the O-ring seals used within the valves had been set aside until now. An O-ring 260 isolates passageway 212 from passageway 214; O-rings 262 and 264 isolates passageway 214 from passageway 240 to which the LS signal is coupled; O-rings 266 and 268 isolate passageway 240 to which the LS signal is applied from the drain passage 230; O-ring 270 isolates drain passage 230 from annular groove 248; O-ring 272 isolates annular groove 248 from the end of passageway 242; and O-ring 274 prevents leakage from the drain passage 228, 230 between cap 220 and housing 218.

Figure 6C:
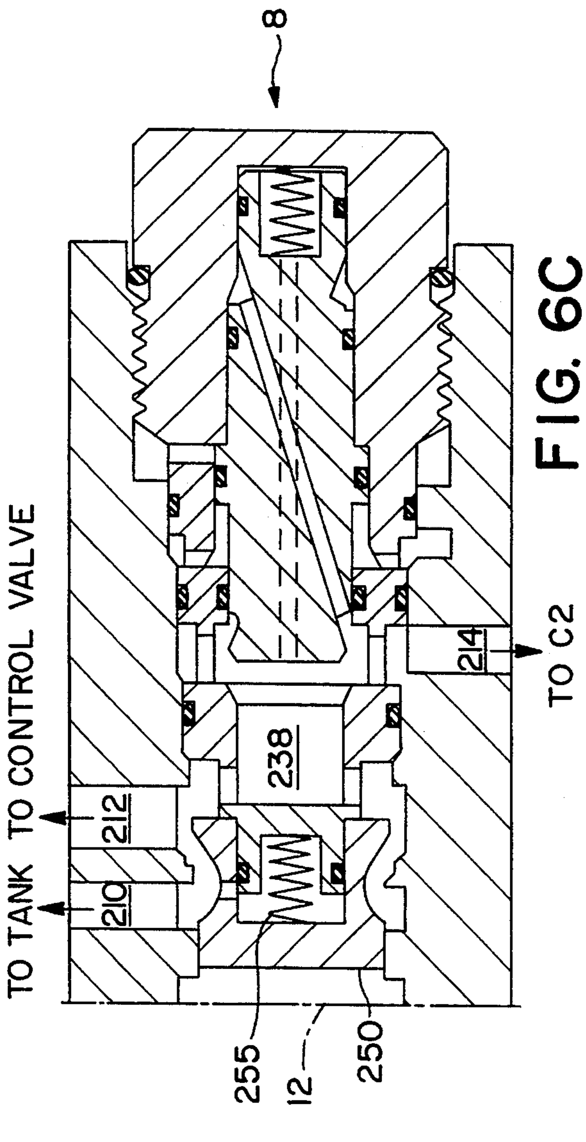
FIG. 6C is a cross sectional view of flow and float check valves incorporating this invention when both valves are open.

FIG. 6C shows both valves 12 and 8 open as they would be in the float mode. Note that the valves 12 and 8 are connected in series between C2, passageway 214, and tank (fluid outlet) 24, passageway 210, as previously described with reference to FIG. 4. Passageway 212 is coupled to outlet 36 of control valve 4, but outlet 36 is not coupled to inlet 28 during the float mode of operation.

Figure 6D:
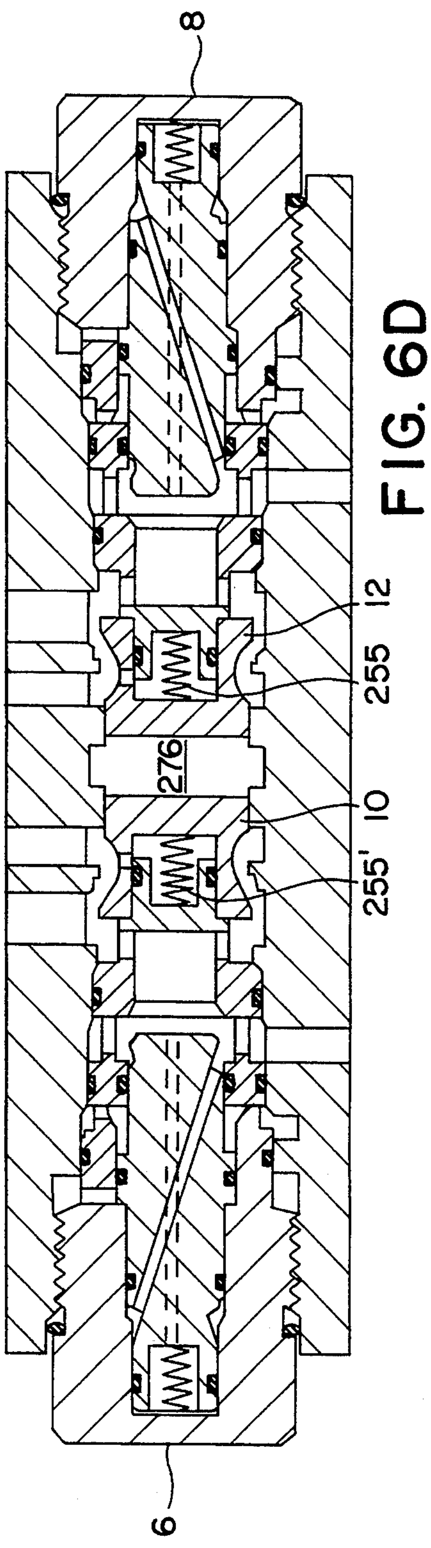
FIG. 6D is a cross sectional view showing how two sets of flow and float valves such as shown in FIGS. 6A, 6B and 6C are combined in actual use.

In the schematic diagrams of FIGS. 1 through 4, two flow 6, 8 and two float check valves 10, 12 are used, thus two sets of valves such as shown in FIGS. 6A, 6B and 6C are required. To illustrate a possible configuration, FIG. 6D shows an orientation of two sets of valves (which represent valves 6, 10, 8, 12) with all valves being open. The float valves 10 and 12 are separated by a chamber 276 that, as is discussed in detail below, is coupled to receive the higher of the pressures in C1 and C2 when they are passed through second stage float control valve 16 during float operation, as seen in FIG. 4. When this pressure occurs, it drives both valves 10 and 12 outwardly to an open position against the closing forces of their springs 255 and 255'.

IV. Structural Description of Control/Flow/Float Integrated (FIG. 7)

Figure 7:
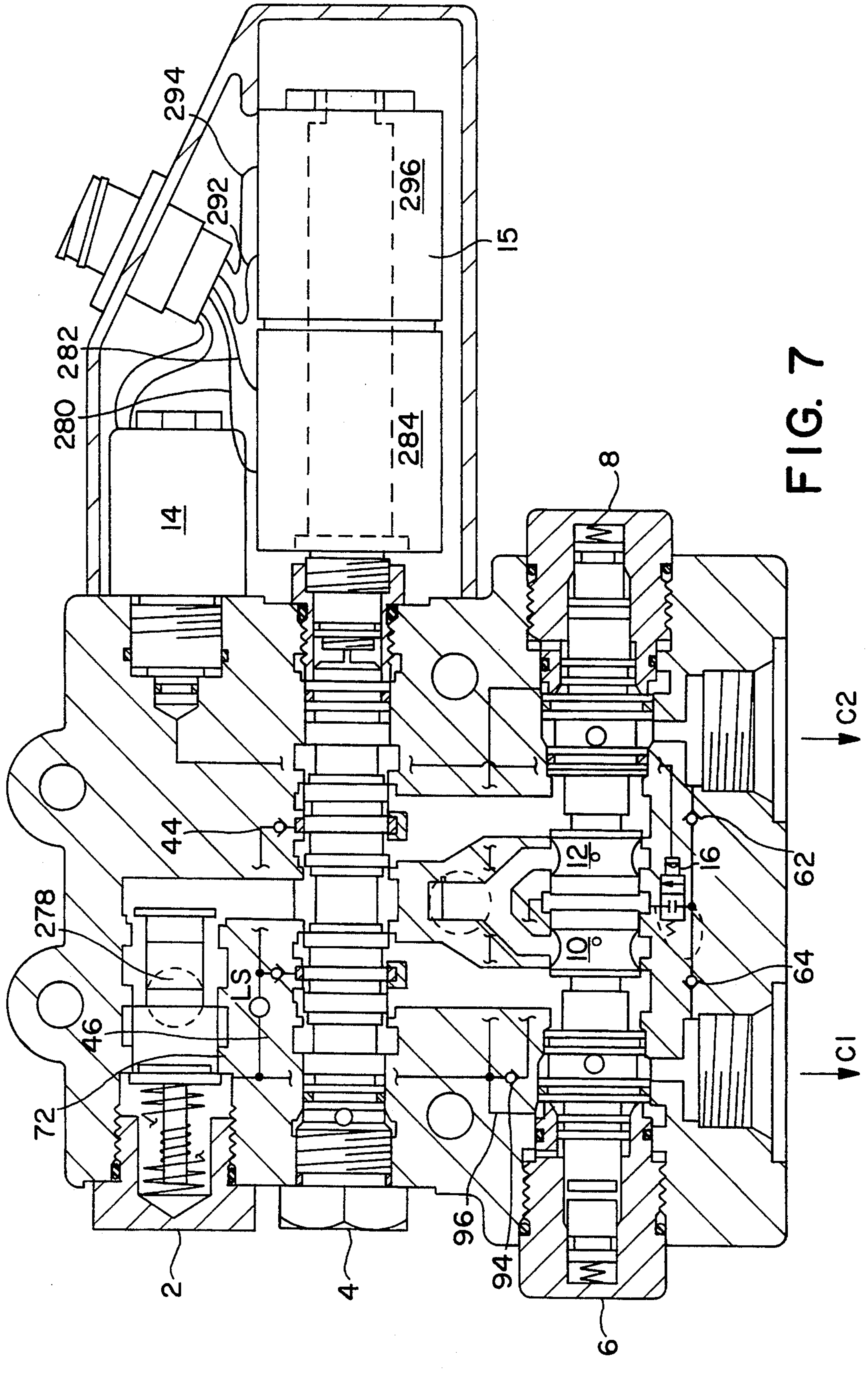
FIG. 7 is a cross sectional view of a system incorporating the control valve of FIGS. 5A and 5B and the two sets of flow and float check valves as shown in FIG. 6D.

Reference is now made to FIG. 7 showing how various components of the invented system are integrated. Note that the control valves and pressure lines are indicated schematically because they can be formed by separate parts that can be physically arranged in a number of ways to perform the same function. In the interest of clarity not all elements of the system are shown, however, it is helpful to view FIG. 7 in conjunction with FIG. 1.

Pressurized hydraulic fluid from the line 26 is supplied at an opening 278 represented as a circle of dashed lines. The LS signal that passes through one or the other of the control check valves, 44 and 46, is applied to inlet 72 of compensator 2 and, via a line 96, to the pressure inlets of the valves 6 and 8, consequently opening them. When first stage float control valve 14 supplies a signal for float operation to the second stage float control valve 16, the higher of the pressures at C2 and C1 is respectively conducted, via control check valve 62 or control check valve 64, through float control 16 to the pressure inlet, chamber 276, of float valves 10 and 12. The pressure at the outlet of second stage float control valve 16 is also applied to control check valve 94 which reaches line 96. Once on line 96, it is applied to the pressure inlets of flow check valves 6 and 8, opening them as well.

V. Push/Pull Pilot Control (FIG. 8)

Figure 8:
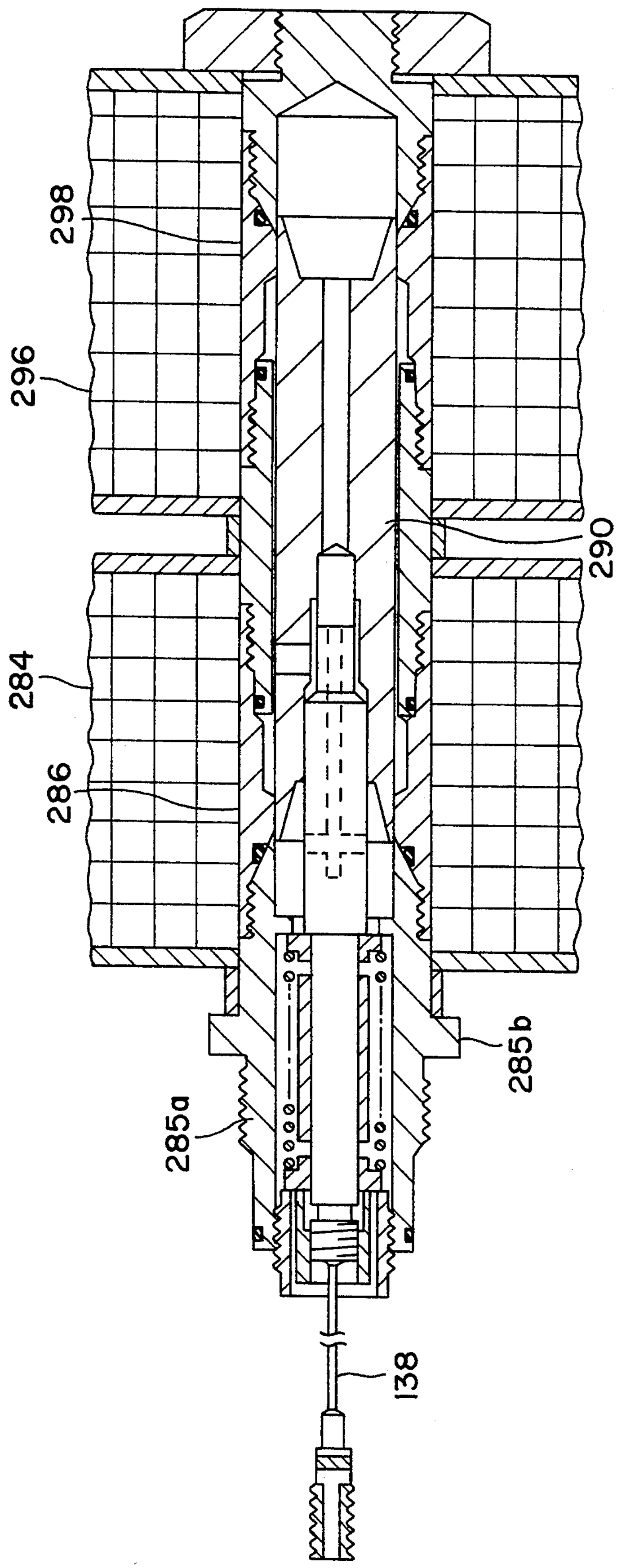
FIG. 8 is a cross sectional view of a driver for controlling the position of a pilot spool in the control valve of FIGS., 5A and 5B.

FIG. 8 shows a cross section of an embodiment of element 15 of FIG. 7 for moving the pilot spool 110 back and forth; as previously described, this has the effect of positioning outer spool 108 as required by the desired flow. Since the type of structure employed operates on the same principles as fully described in U.S. Pat. No. 4,651,118, which is incorporated herein by reference, a detailed description here is not necessary. Suffice it to say that electrical signals cause a current in a coil 284 that with the cooperation of a cylinder 286 of magnetic material causes a shaft 138 containing magnetic material 290 to move in one direction. Electrical signals cause a current in a coil 296 that with the cooperation of a cylinder 298 of magnetic material causes shaft 138 to move in the other direction. The shaft 138 couples the push pull pilot to pilot spool 110.

In the preferred embodiment, shaft 138 is made of spring wire approximately 35 thousandths of an inch. Because of manufacturing tolerances and the practicalities of construction, misalignment of the push pull pilot and pilot spool 110 may exist. The purpose of using a spring wire for shaft 138 is to compensate for misalignment. Without the capability to compensate for misalignment, friction and drag would result between the push pull pilot and pilot spool 110, thus adversely affecting their operation.

In order to adjust the push pull pilot with respect to pilot spool 110, member **285*b* is rotated until zero is achieved. Member 285*a* rotates along with member 285*b* and is received within fixture 140** (shown in FIGS. 5A and 5B).

VI. Structural/Schematic Description of Cross Check Valve (FIGS. 9A, B, C, D)

Figure 9A:
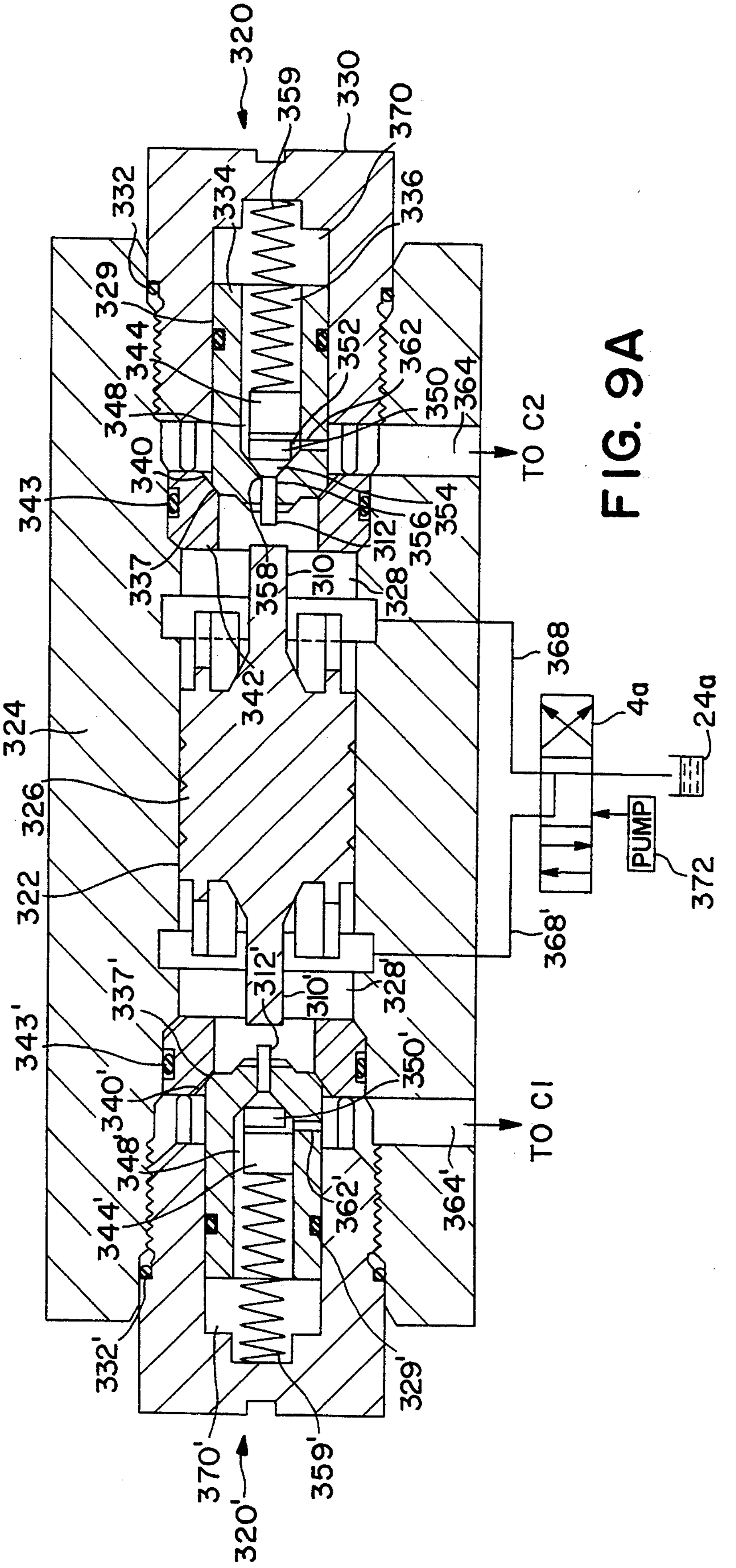
FIG. 9A is a cross sectional view of cross check valves incorporating an aspect of this invention.

Reference is now made to FIG. 9A which illustrates an axial cross section of a high ratio cross check valve constructed in accordance with an aspect of this invention. Because the valve is relatively symmetrical, parts in one half of the valve that correspond to parts in the other half are designated with the same numerals primed. As previously noted, the functions of the cross check valves are (1) to block the flow of hydraulic fluid to or from both cylinders, C1 and C2, when a load is to be held in a raised position and (2) to open C1 to a fluid outlet tank **24*a* when pump pressure from a fluid inlet 28*a*** is applied to C2 and vice-versa.

In FIG. 9A, two identical normally closed check valves 320 and 320' are mounted in opposite ends of a cylindrical opening or cavity 322 in a housing 324, and movable means (in the exemplary embodiment, a movable shuttle) 326 is mounted for sliding movement within the opening 322. When pressurized hydraulic fluid is introduced to a housing cavity 328, via flow line 368, between shuttle 326 and check valve 320, the check valve 320 is opened so that the pressurized fluid flows through passageway 364 to C2. The pressurized fluid also moves shuttle 326 to the left so that a pin 310' thereon engages a pin 312' on check valve 320' and opens check valve 320' so that the cylinder section C1 communicates with cavity 328' and tank **24*a* (an exploded view of pin 312'** is provided in FIG. 9B).

The advantage of this cross check valve is that the pressurized fluid in cavity 328 is applied to the full cross section area of shuttle 326, whereas the pressure that shuttle 326 overcomes when pin 310' engages pin 312' is the pressure applied to the much smaller cross section of the pin 312' (or passageway 356' as shown in more detail in FIGS. 9B and 9C), on the side opposite the engagement. And the pressure being applied to the inner poppet 344 originates from section C1. Using this above described configuration, a ratio of pressures on the order of 35:1 can be obtained. Note that in the preferred embodiment of this aspect of the invention, the valves and the seats are at approximately a 3 degree angle with respect to each other.

Correspondingly, when pressurized fluid is introduced into space 328' between check valve 320' and shuttle 326, check valve 320' is opened to let the pressurized fluid pass through passageway 364' to C1, and shuttle 326 is moved to the right so that its pin 310 strikes pin 312 of check valve 320 which opens it and places space 328 in communication with C2.

The detailed structure of check valve 320 is now described. A cap 330 is screwed into housing 324, and an O-ring 332 forms a seal between them. The inner walls of cap 330 form a valve cavity 329. A main plug or poppet 334 is slideably mounted within cavity 329. Poppet 334 comprises a cylinder having a cylindrical cavity 336 within it. An O-ring 338 forms a seal between cylinder 334 and the inside of cap 330. The inner end of cylinder 334 has an annular surface 337 that can be driven against a cavity orifice (in the exemplary embodiment, an annular seat) 340 in an annular member 342 that is mounted in housing 324 and sealed therefrom with an O-ring 343. Thus, cylinder 334 forms an external valve.

Figure 9B:
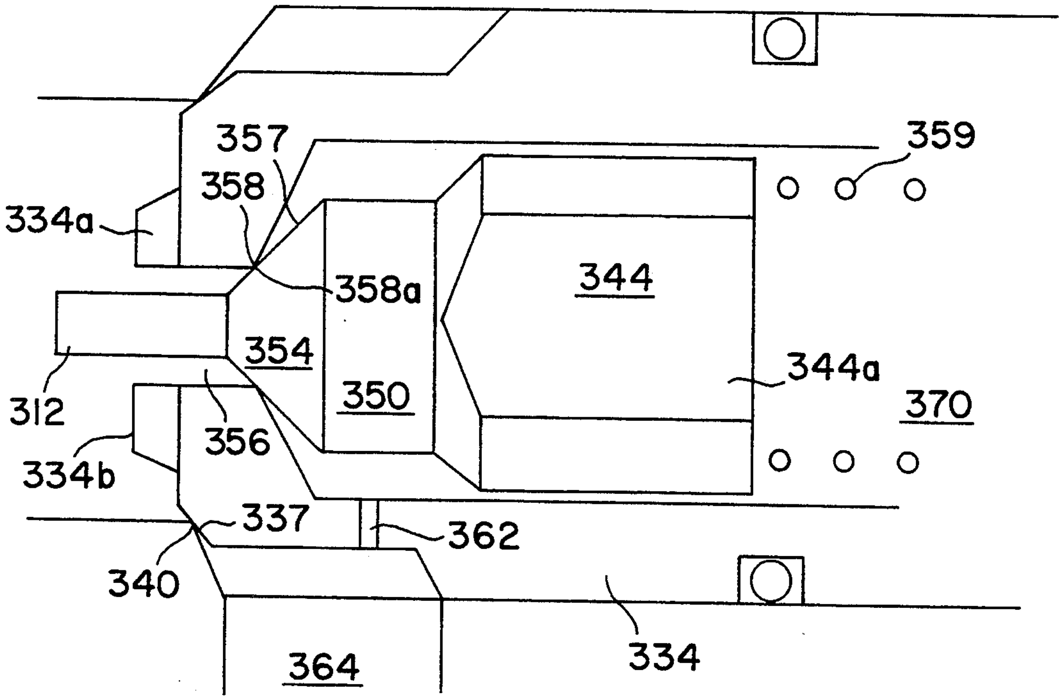
FIG. 9B is an exploded cross sectional view of a portion of the cross check valve of FIG. 9A.
Figure 9C:
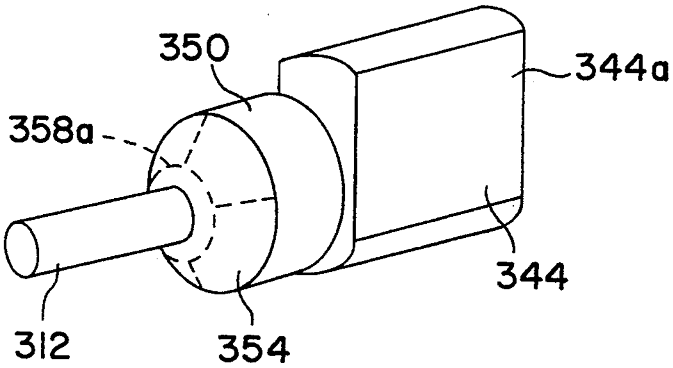
FIG. 9C is a perspective of a component seen in FIG. 9B.

Within cylinder 334 an internal valve is slideably mounted. In FIGS. 9B and 9C, the internal valve is shown in more detail. Continuing with the description and referring to FIGS. 9B and 9C, inner plug or poppet 344 has a non-tapered cylindrical pin 312 which extends into a poppet faced taper 354 and then into a cylindrical body portion of poppet 344. In addition, a flat **344*a* permits oil to flow around section 350 through flat 344*a* to the rear chamber 370. It will be seen that surface (control taper) 357 engages a plug orifice (hereinafter referred to as seat) 358 of the main poppet 334 at a control edge 358*a*. Thus, when shuttle 326 engages pin 312, it is effective to push pin 312 thereby to unseat the control edge 358*a* and to allow fluid flow through passageway 356**.

More particularly, in operation, valve 344 is in its illustrated position in which taper 357 engages seat 358. In this closed position, bias spring 359 engages poppet 344 to provide the foregoing seal. In this way, the poppet 344 at section 354 engages seat 358 thereby pushing forward outer poppet 334 to engage its corresponding seat 340. The main poppet 334 has its seat on wall 337 against housing seat 340. In this way, the spring pushes the poppet 344 which pushes poppet 334 to seal against seat 340 in a valve closed position, and both poppets are sealed.

Cylinder pressure is applied through inlet 364 through orifice 362 into the chamber around wall 350 and then through flat **344*a* and thus to chamber 370. In this way, the pressure in the area of chamber 370 is effective to push poppets 344 and 334 to the left together with the spring force to maintain these poppets closed. It is understood that the difference in the outer diameter of pin 312 and the inner diameter of bore through which it is disposed defines passageway 356**, and this passageway is an effective orifice.

In FIG. 9A, a control valve **4*a*, like the one shown in FIGS. 1–4, is shown as connecting space 328 and space 328' together as well as to tank 24*a* via lines 368 and 368' so that no net force is applied to the shuttle in either direction. Any load pressures in C2 pass through passageway 364, passageway 362, annular space 352, and around flat 344*a* to a space 370 between cylinder 334 and cavity 329 of cap 330, thereby forcing conical valve 344 against its seat 358 and annular surface 337 and the inner end of cylinder 334 against its seat 340**. A similar action takes place with the corresponding primed elements, if load pressure is present in C1 so as to close the inner and outer valves.

If control valve **4*a* is moved to the right, hydraulic fluid under pressure is applied to line 368', and tank 24*a* is connected to line 368**. The high pressure fluid in space 328′ overcomes the force of spring 359′ and moves the outer valve 334′ to a valve open position, via surface 337′ and seat 340′, so that the fluid can flow to C1 via space 328′ and passageway 364′. Shuttle 326 is forced to the right so that its pin 310 forces pin 312 of valve 320 against the combined force of spring 359 and the small force exerted on cylinder 334 by fluid pressure in chamber 370 which moves the inner valve 344 to a plug open position. Any pressure in chamber 370 of cap 330 is released to tank 24*a* via passageway 348, annular passageway 352, radial passageway 362 and passageway 364, thus requiring little force for pin 310 to open the outer valve 334 and provide coupling between tank 24*a* and passageway 364.

Figure 9D:
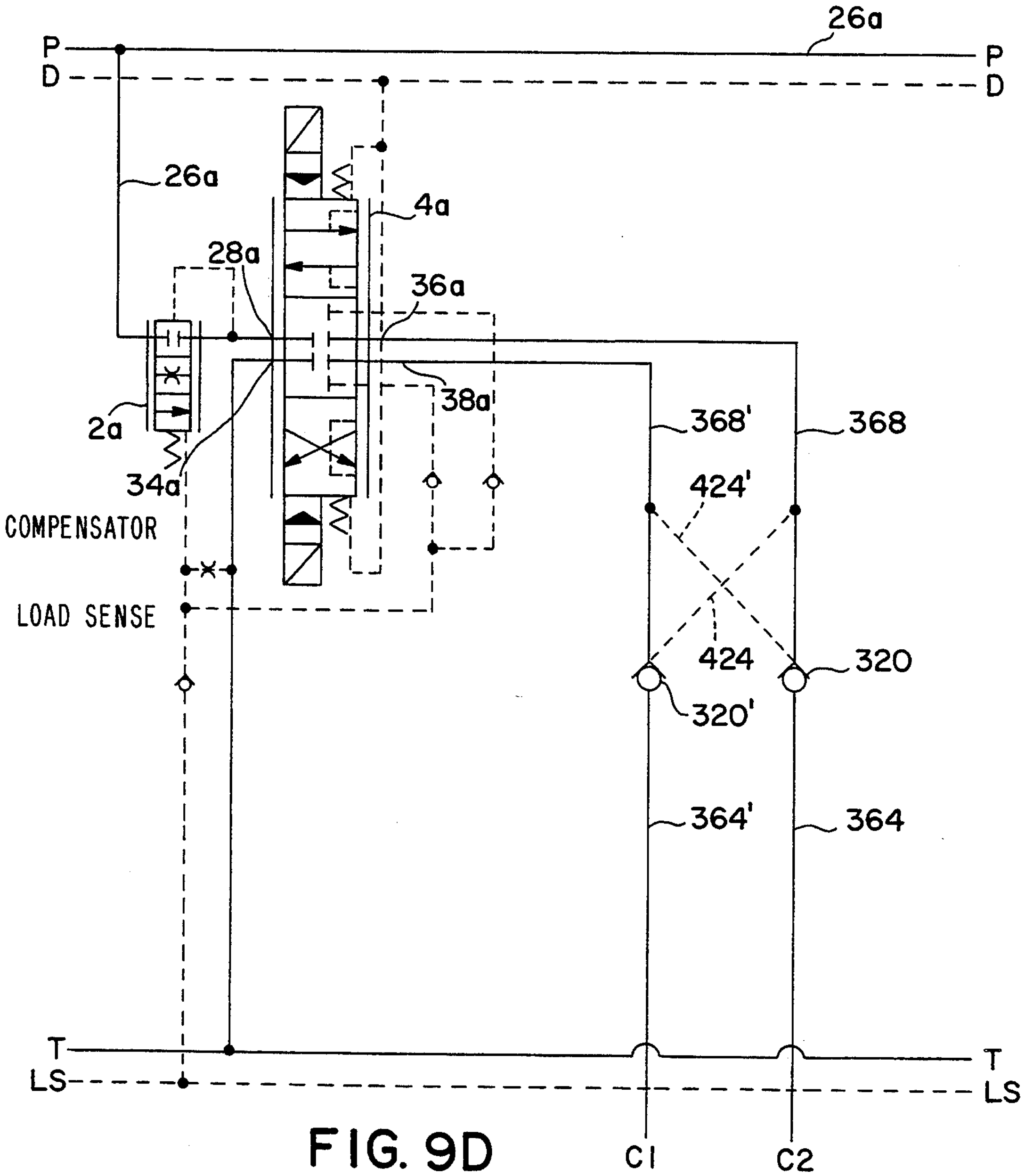
FIG. 9D is a schematic representation of the cross check valve in FIG. 9A integrated within a system.

In one form of operation, the check valve 320 is opened by the pressure from in-line 368. This pressure is effective to unseat poppet 334 from seat 340 while the poppet 344 remains seated at seat 358. The pressure from inlet 368 is effective in cavity 328 to push poppet 334 to the right, and the fluid in 370 then flows out into line 364 through orifice 336. This is the normal forward flow direction as seen in FIG. 9D as coming from line 368, for example. Thus, the spring 359 is sized to maintain the sealing of poppet 344 during this operation. Thus, hydraulic fluid flows freely from 368 into 364 to cylinder C2.

The additional operation occurs when cavity 328 is pressurized by movement of shuttle or piston 326 to the left. In this way, pin 310′ engages pin 312′ opening seat 358′. Accordingly, oil then flows from chamber 370′ through flat 344*a*′ and then through passage 356′ into cavity 328′ and through line 368′. At the same time, fluid flowing from 364′ and entering through orifice 336′ also flows through passage 356′. As shuttle 326 moves to the left, it then engages the face 334*b*′ of poppet 334 and is effective then to unseat the valve at seat 340. The shuttle 326 continues to move to the left moving poppet 334′ to the left thereby fully opening poppet 334′ and allowing free flow from line 364′ to line 368′.

It will be understood that when pin 310′ engages phase 334*b*′, it seals the face and prevents flow of fluid from passage 356′. However, there is provided a milled slot 334*a*′ to allow for free flow.

When valve 4*a* is centered and there is no longer any flow of fluid on line 368, then the springs 359 and 359′ not only re-center the poppets but also are effective to re-center shuttle 326.

As previously noted, an advantage of this cross check valve is that the force driving it open is proportional to the cross sectional area of shuttle 326, whereas the force that must be overcome for it to be opened is proportional to the cross sectional area of pin 312 (or passageway 356 through which pin 312 is inserted). The ratio of these areas and, thus, the ratio of the forces can be on the order of 35:1 so that any steps of intermittent motion resulting from the balancing of pressures are negligible. For example, if due to a load the pressure in space 328′ is 3500 pounds per square inch, the pressure holding valve 337, 340 closed would be only 100 pounds per square inch, whereas a prior art valve requires the corresponding pressure to be 875 pounds per square inch.

To supplement the above description, FIG. 9D schematically represents a cross check valve like the one in FIG. 9A integrated within a system similar to that shown in FIGS. 1–4. With compensator 2*a* connecting line 26*a* with control valve inlet 28*a*, and control valve 4*a* coupling inlets 28*a* and 34*a* to 36*a* and 38*a* respectively, the cross check valve operation will be described.

In FIG. 9D, high pressure flow line 26*a* is coupled to flow line 368. The hydraulic fluid in line 368 opens valve 320 and flows to section C2 of a cylinder (not shown). And it is the pressure in line 368, via line 424 (which relates to the discussion of shuttle 326 from FIG. 9A), which opens valve 320′, thus connecting section C1 to the tank (not shown).

Now, if, for example, the load on the system moves the piston in the cylinder (not shown) fast enough that section C2 enlarges faster than line 364 can supply pressurized fluid, a low pressure results. This low pressure, in turn, travels up line 364 and, if low enough, can no longer supply the necessary pressure on line 424 to keep valve 320′ open. This would cause valve 320′ to close which means the moving load would stop until line 368 could once again reach the necessary pressure.

As imagined, if this process is repeated, it translates into moving a load in a jerky fashion. To reduce, if not eliminate, the effects of this process on the system, the pressure necessary to open valve 320′ via line 424 is minimized. Thus, a ratio on the order of 35:1 versus that on the order of 5:1 for prior art represents a significant improvement for such systems.

VII. Structural Description of Control/Cross Valves Integrated (FIG. 10)

Figure 10:
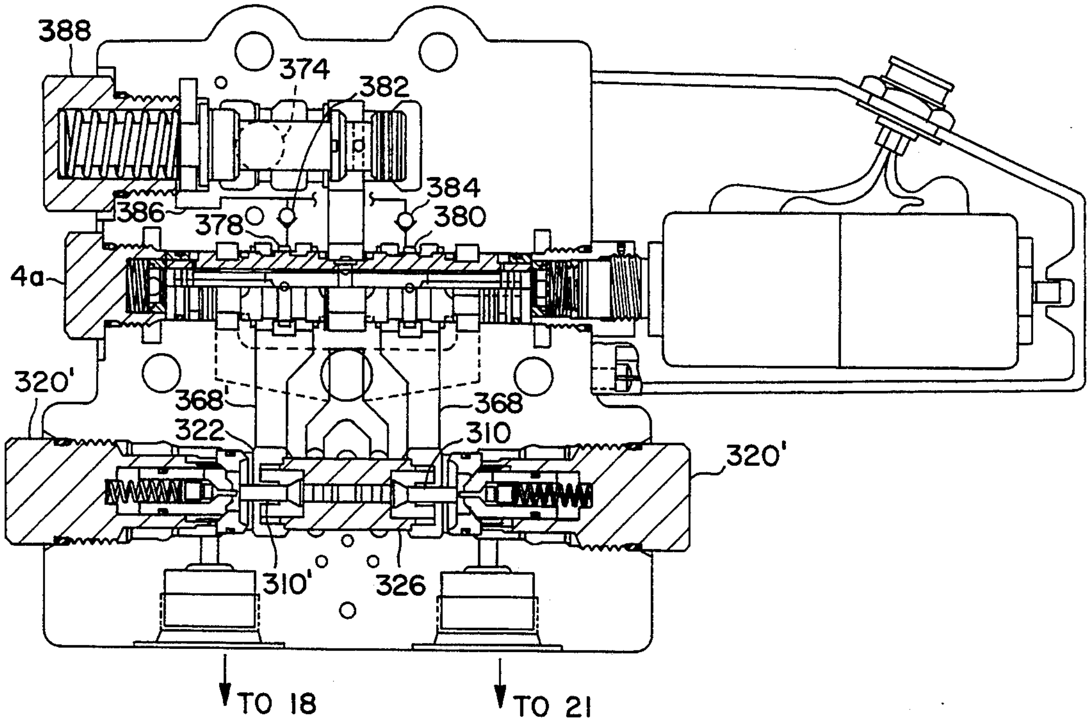
FIG. 10 is a cross sectional view of a system incorporating the cross check control valves shown in FIG. 9A.

Reference is now made to FIG. 10 illustrating how a cross check valve of FIG. 9A is integrated in a system. Pressurized hydraulic fluid is supplied to an opening 374 by a pump, not shown. A control valve 4*a*, schematically shown in FIG. 9A, provides LS signals at points 378 and 380 in the same way as control valve 4 of FIG. 7. Points 378 and 380 are respectively coupled to control check valves 382 and 384. The outlets of these valves are coupled by line 386 to an inlet of compensator 388, and the pressure at opening 374 is coupled to another inlet not shown. Compensator 388 maintains a constant difference between the pressure at opening 374 and the higher of the LS signals at 378 and 380.

As in FIG. 7, the pilot spool, not shown, in control valve 4*a* is moved back and forth in the outer spool by a proportional drive means 15 like that described in connection with FIG. 8 for coupling lines 368 and 368′, like that described in connection with FIG. 9A. The flow lines 368 and 368′ are coupled to cross check valve 390 which is like the cross check valve of FIG. 9A.

What is claimed is:

1. A system having a load sense signal for modulating the fluid inflow to first and second sides of load means comprising:

a) a control valve for opening and closing to control the flow of fluid from a fluid inlet and a tank to first and second flow outlets, said control valve having (1) a closed state (2) at least one open state;

b) pilot means selectively coupled to one of the sides of the load means for receiving fluid from the one side of the load means at a load pressure, and for providing the fluid at the load pressure forming a pilot pressure signal;

c) first and second hydraulically operated check valve assemblies each assembly having;

i) first and second plug means movable between (1) valve normally closed states seating in and closing respective first and second orifices for preventing flow of fluid through respective first and second orifices and (2) valve open states, said first and second plug means being individually operated and not mechanically connected to each other;

ii) means, for biasing said first and second plug means toward their respective orifices for normally maintaining said check valves closed;

iii) a load sense inlet fluidly coupled to said first plug means for receiving one of said load sense signal and said pilot pressure signal, such that either one of said load sense signal and said pilot pressure signal is sufficient to move said first plug means to its valve open state;

d) means for fluidly coupling first and second flow outlets with respective first plug means in the respective first and second check valve assemblies;

e) means for providing said load sense signal for moving the first plug means in each check valve assembly to its valve open state when said control valve is in said open state;

f) means for fluidly coupling first and second sides of the load means with respective first plug means in said first and second check valve assemblies when said first plug means are in the valve open state;

g) means responsive to said pilot pressure signal for moving all of said first plug means and second plug means to their valve open states;

h) means for fluidly coupling each respective side of the load means to the tank when respective first and second plug means are in said valve open state;

wherein fluid flows between the tank and one of first and second sides of the load means and between the fluid inlet and the other side of the load means actuating the load means when both of the first plug means are in their valve open states and both second plug means are in their valve closed states, and fluid flows between the tank and each side of the load means permitting the load means to move freely when all of said first and second plug means are in their valve open positions.

2. A system according to claim 1, wherein each of said first plug means comprises a respective flow check valve.

3. A system according to claim 2, wherein each of said second plug means comprises a respective float check valve.

4. A system according to claim 3, wherein each of said float check valves includes means for preventing cavitation.

5. A system according to claim 3, further comprising a housing having a passage in which the first and second check valve assemblies are located.

6. A system according to claim 5, wherein each of said float check valves is positioned in the passage between said flow check valves.

* * * * *